United States Patent [19]
Coty et al.

[11] 3,767,527
[45] Oct. 23, 1973

[54] METHOD FOR PRODUCING HYDROCARBON-UTILIZING YEASTS

[75] Inventors: Vernon F. Coty, Trenton; Richard I. Leavitt, Pennington, both of N.J.

[73] Assignee: Mobil Oil Corporation, New York, N.Y.

[22] Filed: Oct. 7, 1971

[21] Appl. No.: 187,495

Related U.S. Application Data

[63] Continuation-in-part of Ser. No. 804,303, March 4, 1969, abandoned.

[52] U.S. Cl. ............................................. 195/28 R
[51] Int. Cl. ............................................. C12b 1/00
[58] Field of Search .................. 195/28 R, 3 H; 252/328, 330

[56] References Cited
UNITED STATES PATENTS

| | | | |
|---|---|---|---|
| 2,697,062 | 12/1954 | Cramer | 195/3 H |
| 2,975,103 | 3/1961 | Kirschenbaum | 195/3 H |
| 3,522,147 | 7/1970 | Filosa | 195/28 R |

OTHER PUBLICATIONS

Berkman et al. "Emulsions & Foams" 1941 Reinhold Publishing Co., New York, pp. 285–293.

Bennet, "Practical Emulsions" 1943 Chemical Publishing Co., New York, pp. 77–79.

*Primary Examiner*—Lionel M. Shapiro
*Assistant Examiner*—R. B. Penland
*Attorney*—Frederick E. Dumoulin et al.

[57] ABSTRACT

This specification discloses a method for producing aerobic, hydrocarbon-utilizing yeasts. The yeasts are grown in an oxygen-containing incubation zone in an agitated culture mixture in the form of an oil phase-continuous emulsion of oil and water. The oil phase of the emulsion comprises a hydrocarbon and the water phase comprises an aqueous mineral nutrient solution. The pH of the emulsion is maintained in the range of 2–4 during growth of the yeasts and the yeasts are grown to a desired extent but not to a point where the emulsion inverts into a water phase-continuous emulsion. The pH of the emulsion is then raised at least one-half pH unit into the range of above 4 but not above 5, thereby separating the emulsion into an oil phase and a water phase, the water phase containing the yeast cells. The yeast cells are then recovered from the water phase.

5 Claims, No Drawings

METHOD FOR PRODUCING HYDROCARBON-UTILIZING YEASTS

CROSS REFERENCE TO RELATED APPLICATIONS

This application is a continuation-in-part of our copending application, Ser. No. 804,303, filed Mar. 4, 1969 now abandoned.

BACKGROUND OF THE INVENTION

1. Field of the Invention

This invention relates to the growth of aerobic, hydrocarbon-consuming yeasts and relates more particularly to the recovery of the yeast cells from the culture mixture.

2. Description of the Prior Art

Hydrocarbon-consuming yeasts have heretofore been grown in culture mixtures comprising an oil phase-continuous emulsion wherein the oil phase is a hydrocarbon upon which the yeasts can grow and the water phase is an aqueous mineral nutrient solution.

Oil phase-continuous emulsions comprising crude petroleum oil and water have heretofore been broken by addition thereto of basic compounds such as sodium hydroxide or sodium bicarbonate.

SUMMARY OF THE INVENTION

Aerobic, hydrocarbon-utilizing yeasts are grown in an oxygen-containing incubation zone in an agitated culture mixture in the form of an oil phase-continuous emulsion of oil and water. In this emulsion, the oil phase comprises a hydrocarbon and the water phase comprises an aqueous mineral nutrient solution. During growth of the yeasts, the pH of the emulsion is maintained in the range of 2–4. The yeasts are grown to a desired extent but not to a point where the emulsion inverts into a higher viscosity, more stable, water phase-continuous emulsion. The pH of the emulsion is then raised at least one-half pH into the range of above 4 but not above 5 thereby separating the emulsion into an oil phase and a water phase, the water phase containing the yeast cells. The yeast cells are then recovered from the water phase.

DESCRIPTION OF THE PREFERRED EMBODIMENTS

Growing yeasts is of importance in view of the ability of many species to produce from low cost hydrocarbons valuable products like protein in appreciable amounts, a fact which makes them of value as feed for cattle and other animals, including humans. The rate of formation of protein increases with the rate of cell growth, and as a result, less time is required before harvesting of the cells may take place.

An aerobic, hydrocarbon-utilizing yeast is grown in a culture mixture, in the presence of oxygen, at a temperature of about 20° to 55° C., preferably 25° to 40° C. The culture mixture comprises a hydrocarbon, an aqueous mineral nutrient solution, and the yeast. The hydrocarbon provides the sole source of carbon for energy and growth of the yeasts and the aqueous mineral nutrient solution provides the minerals required for growth of the yeasts. The culture mixture is in the form of a water-in-oil, or W/O, emulsion, by which is meant an oil phase-continuous emulsion where the oil is to be understood as signifying the hydrocarbon, and for obtaining such emulsion there is also present an ionic or nonionic emulsifying agent or detergent, preferably an oil soluble one, which promotes, i.e., insures, a water-in-oil emulsion. In this form, the culture mixture is of relatively low viscosity, which means that it is easier to agitate and to pump, and it is a stable emulsion, which means that it may be reproduced time after time in a controlled way, a factor of importance for commerical processing. Also, in an oil phase-continuous emulsion, greater amounts of oxygen may be introduced through the continuous hydrocarbon phase than would be the case where the emulsion is an aqueous phase-continuous, or O/W, emulsion, owing to the greater solubility of oxygen in the former phase; thus more oxygen is accessible to the cells, which tend to be concentrated in the emulsion interface.

During growth of the yeasts, the culture mixture is maintained within the range of 2–4. By maintaining the pH of the culture mixture within this range, growth of the yeasts is assured. Yeasts grow satisfactorily within this pH range. On the other hand, within this pH range, the growth of other microorganisms including bacteria and molds is inhibited or even entirely excluded. Thus, within this pH range, there is no competition by other microorganisms for the hydrocarbon as a source of carbon for energy and growth. As a result, the yield of yeast per unit amount of hydrocarbon consumed is increased over what it otherwise would be. Of greater importance, however, is that contamination of the yeast product by other microorganisms is minimized since even if these microorganisms gain access to the culture mixture, they will not grow or will grow only to a limited extent. Accordingly, by maintenance of this pH range, sterilization procedures to insure that other microorganisms do not gain access to the culture mixture may be minimized or eliminated. Further, by maintaining this pH range, the culture mixture remains in its form of a water-in-oil emulsion.

Growth of the yeast in the culture mixture is carried out to a desired extent, preferably to a point where the concentration of yeast cells is appreciable, but not to a point where the emulsion inverts to an oil-in-water, or aqueous phase-continuous, emulsion. Such inversion may occur for various reasons, but usually through the agency of certain metabolic products of the cells which act like water soluble emulsifying agents capable of promoting an oil-in-water emulsion. The disadvantages of such inversion are that the resulting O/W emulsion exhibits a relatively high viscosity, making it more difficult and more expensive to agitate and to pump the emulsion; and the oxygen transfer rate through the continuous aqueous phase is much less, i.e., only one-sixteenth to one-tenth of that through the continuous hydrocarbon phase of the original W/O emulsion, thus reducing the oxygen supply to the cells and impeding their growth. The described inversion during cell growth may be avoided in several ways, as by periodically monitoring the culture mixture to see that it is oil phase continuous; or by making one or more trial runs to determine appropriate time versus cell density data by which to guide future runs; or in other ways.

While emulsion inversion during growth is to be avoided, it is nevertheless possible and feasible to maintain the W/O emulsion near to inversion conditions during the period of growth in order to gain some substantial advantages, one of which is that foaming of the culture mixture is minimized, and another of which is that separation of the emulsion, when effected at the end of the growth period, tends to be more complete than otherwise. Maintenance of the culture mixture emulsion near to inversion conditions during cell growth may be aided (1) by using a concentration of the described emulsifying agent at a relatively low value but sufficient to override the effects of the described cell metabolic products throughout the desired growth period, and for practical purposes such concentration may be in the range of 0.1 to 3.0 percent, preferably 0.5 to 1.5 percent, volume basis, of the emulsion; (2) by keeping the temperature of the emulsion in the described range of 20° to 55° C., preferably 25° to 40° C.; and (3) keeping the amount of hydrocarbon in the emulsion in the range of 15 to 85 percent, preferably 25 to 75 percent, volume basis. A trial run may help fix the emulsifying agent concentration more exactly within said ranges. Such agent should be one which promotes a water-in-oil emulsion at a temperature falling within the foregoing temperature ranges, and if desired, a combination of two or more agents may be used.

When growth of the yeast has reached a desired level of cell density, the W/O emulsion which constitutes the culture mixture is broken in order to recover the cells. This step is accomplished by changing the pH of the culture mixture, the change being in a direction, i.e., an increased pH, that effects breakdown of the emulsion, whereupon the cells stream down to the bottom of the mixture and may be recovered as by decanting the supernatant. More particularly, the culture mixture emulsion is maintained, as previously mentioned, at a pH of 2–4 during cell growth, and in order to effect breakdown of the emulsion, the pH is increased by at least one-half pH unit into the range of above 4 but not above 5. It will be understood that an increase in pH of at least one-half pH unit is always made. It will also be understood that the increase is to be such that the pH of the culture mixture will be above 4 but will not be above 5. Thus, if growth is carried out at a pH of 4, the increase will be at least one-half pH unit and the pH will have been increased to above 4. However, the increase must be such that the pH will not have been increased to above 5, i.e., the increase in this case will not be more than 1 pH unit. If growth is carried out at a pH of 3, the increase will be more than 1 pH unit to increase the pH to above 4 but the increase will not be more than 2 pH units else the pH will have been increased to above 5. Similarly, if growth is carried out at a pH of 2, the increase will be more than 2 pH units but will not be more than 3 pH units.

Increase of the pH of the culture mixture above 5 is to be avoided. With increase of the pH of the culture mixture above 5, the breakdown of the emulsion is not as effective as it is at a pH in the range above 4 but not above 5. Further, where the culture mixture, after breakdown and recovery of the yeast cells, is reused or recycled for the growth of further yeast cells, a lesser adjustment of the pH to within the range of 2–4 is required than where the pH is above 5.

Upon breaking of the emulsion, it separates into an oil phase and a water phase. These are distinct phases, the water phase forming a bottom layer and the oil phase forming an upper layer. The yeast cells are in the bottom layer and this separation of the emulsion into two distinct phases with the yeast cells in the water layer is a particular feature of the invention leading to the recovery of the yeast cells. With the yeast cells in the water phase, they may be recovered therefrom by relatively simple means. Thus, they may be recovered from the water phase merely by decantation. Filtration or centrifugation may also be used for separation but the use of such separation means ordinarily is not required. Even where filtration or centrifugation is used, the extent of separation obtained under comparable conditions is greater than that which would be obtained where the cells are in other than the water phase.

Various yeasts may be grown by the method of the invention. The preferred yeasts are of the family Cryptococcaceae, and particularly of the subfamily Cryptococcoidae. Preferred genera are Torulopsis (or Torula), Candida, and Pichia. Species which may be employed include *Candida lipolytica*, *Candida pulcherrima*, *Candida utilis*, *Candida utilis Variati major*, *Candida tropicalis*, *Candida intermedia*, *Troulopsis colliculosa*, and *Pichia polymorphus*. Other useful species are *Hansenula anomala*, *Oidium lactia*, and *Neurospora sitophila*. Another useful genus is Trichosporon. Preferred species are *Pichia polymorphus* and *Candida lipolytica*.

The hydrocarbon may be chosen from a broad selection, including aliphatic, aromatic and alicyclic compounds of varying molecular weight and carbon configurations. Crude oils, various petroleum fractions, residua, etc. are suitable. A preferred class of hydrocarbons comprises alkanes having up to 20, 30, or 40 carbons, more preferably those that are liquid at normal temperatures and pressures, especially incubation temperatures, and including straight and branched chain, saturated and unsaturated hydrocarbons.

Another preferred class comprises alkyl-substituted cyclic compounds having 1,2, or more alkyl substituents each of any suitable length and comprising straight or branched chain, saturated or unsaturated radicals, and in which the cyclic moiety is aromatic or cycloparaffinic.

Alkyl-substituted aromatic hydrocarbons include toluene, the various xylenes, mesitylene, ethylbenzene, p-cymene, the diethylbenzenes, and the isomeric propylbenzenes, butylbenzenes, amylbenzenes, heptylbenzenes, and octylbenzenes. Included among the alkyl-substituted cycloparaffins are methylcyclopentane, the dimethyl- and trimethylcyclopentanes, ethylcyclopentane, the diethylcyclopentanes, the various propyl-, butyl-, amyl-, hexyl-, and octylcyclopentanes. Also the alkylcyclohexanes, which are substituted in a manner corresponding to the foregoing alkylcyclopentanes, and further including such compounds as the various tetramethylcyclohexanes, methylethylcyclohexanes, methylpropylcyclohexanes, and the like.

It will be understood that the foregoing hydrocarbons are suitable sources of carbon for cell growth and energy and are capable of being incubated with the cells. Also, it will be appreciated that the hydrocarbon may be in the liquid phase not only by having a suitable melting point but also by being dissolved in a suitable solvent. The hydrocarbons contemplated in the preceding paragraphs are those which are normally liquid at incubation temperature. However, other useful hydrocarbons are those which are normally gaseous at incubation temperature, such as methane, ethane, propane, butane, and other C3 to C5 hydrocarbons. These gaseous hydrocarbons may be dissolved in a normally liquid hydrocarbon, such as a petroleum fraction in the gasoline or kerosene boiling range, or in an alkane like octane, nonane, decane, etc.; or they may be dissolved in any other conventional solvent therefor which is inert in the process and non-toxic to the cells. Also, normally solid hydrocarbons may be used as the source of carbon by dissolving them in a hydrocarbon solvent, in the manner described, or in any other conventional inert non-toxic solvent.

Turning now to the emulsifying agent, also termed a surface active agent and a detergent, it is preferably a nonionic compound having an aromatic nucleus, such as a phenyl ring, substituted by a side chain of hydrophilic character such as a polyoxyethylene group, and by a side chain of lipophilic character such as an alkyl group. Agents of this kind are frequently referred to as polyoxyethylene alkyl aryl ethers, obtainable as by reacting an alkylphenol, such as nonyl phenol, with ethylene oxide. A particular agent of this kind is a branched chain nonyl phenol ethoxylate having 4 ethylene oxide groups.

Other useful nonionic agents are polyoxyethylene glycols and alkyl ether derivatives thereof; and methoxy polyoxyethylene glycols and their ester derivatives.

Still other agents are fatty acid esters, including mono- and diesters, formed from a polyol and a fatty acid. The polyol may be glycol, glycerol, sorbitol, sorbitan, mannitol, propylene glycol, polyoxyethylene glycol, etc., and the acid may be an aliphatic monocarboxylic acid, saturated or unsaturated, straight or branched chain, preferably having from 12 to 18 carbon atoms. Examples are glycerol mono- and dilaurates, glycerol mono- and dioleates, glycerol mono- and distearates glycerol monopalmitate, glycerol monomyristate, propylene glycol monostearate, propylene glycol monopalmitate, propylene glycol monooleate, and mixtures thereof. Also, sorbitan laurate, sorbitan mono- and tristearates, sorbitan mono- and trioleates; mannitan stearates, palmitates, and laurates; mono-, di-, and triglycerides of fatty acids like oleic, palmitic, and stearic; glycerol sorbitan laurate; also polyoxyethylene laurates, stearates, oleates, and palmitates; and polyoxyethylene sorbitan palmitates, oleates, stearates and laurates. Sucrose mono- and dipalmitates are suitable, as well as other mono- and diesters of sucrose and fatty acids of, preferably, at least 12 carbon atoms, including sucrose monolaurate, sucrose monostearate, sucrose monooleate, sucrose dilaurate, sucrose dimyristate, sucrose distearate, sucrose dioleate, and the like.

Other suitable nonionic agents are fatty acid derivaties formed by reaction of a fatty acid and ethylene oxide. Also alcohol derivatives formed by reaction of a fatty alcohol (having at least 8 carbons) with ethylene oxide. Still other agents are fatty amide derivatives having an oxygenated side chain of hydrophilic character, with the lipophilic portion of the compound being due to the amide grouping. These derivatives may be formed by reaction of a fatty acid amide and ethylene oxide, or by reaction of a fatty acid or ester with an alkanolamine.

Particularly useful are polymeric emulsifying agents of the formula:

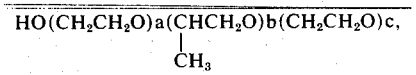

where $a$, $b$, and $c$ may be of variable value sufficient to give a molecular weight ranging from several hundred to several thousand. These materials are block-polymers. Other useful polymeric agents include graft and block copolymers. Also all-block nonionic polymeric agents, block-hetero or heteric-block nonionic polymeric agents, and all hetero nonionic polymeric agents. Some of these materials may be expressed by means of the following formulas:

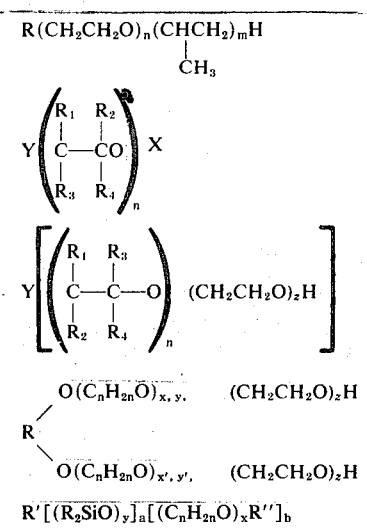

In the foregoing formulas, the following values are to be noted: R may be a straight or branched chain alkyl group, or substituted alkyl group, or an aryl group, or an aralkyl or alkaryl group, or a substituted aryl, aralkyl, or alkaryl group, and $R_1$, $R_2$, $R_3$, $R_4$, $R'$, $R''$, Y, and X may be chosen from the foregoing groups. The subscripts $n$, $m$, $x$, $y$, $z$, $x'$, $y'a$, and $b$ may each represent a number varying from 1 to 10, 20, 50, 100, or more. Also contemplated for use are polymeric emulsifying agents, such as those set forth above, which contain one or more atoms of titanium, zirconium, germanium, phosphorus, or nitrogen.

As to ionic emulsifying agents, these may be cationic, anionic, or amphoteric, and may be used singly or in combination. They should preferably have a hydrophile-lipophile balance (HLB) of 2 to 8 and should be more soluble in hydrocarbons than in water or water solutions. Anionic agents include long-chain alkane sulfonates of the type $RCOOCH_2CH_2SO_3M$, long-chain amides of sulfosuccinic acid of the type

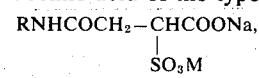

and phosphate esters as exemplified by

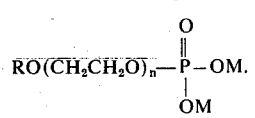

Cationic agents may be exemplified by long-chain tetraalkylammonium bromides,

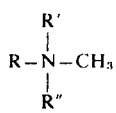

Br, and by long-chain alkylamine hydrochlorides, RNH₃Cl. Amphoteric agents contain both anionic and cationic groups and may be illustrated by anionic acid derivatives like RNHR'COOM and by derivatives of imidazoline,

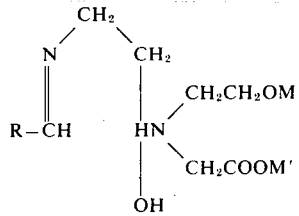

In the foregoing, the values R, R', and R'' may be as described in the preceding paragraph. The terms M and M' may represent any suitable metal, including alkali metals, alkaline earth metals, etc., and also including ammonium cation. Whatever ionic agent is selected, care should of course be used to see that it does not adversely affect the yeasts, or the stability of the W/O emulsion. Where the yeasts are to be used as or in food, the agent should be safe to the food user or easily removable.

The aqueous mineral salt nutrient is conventional, comprising a source of nitrogen such as nitrate or nitrite or ammonium salt or urea, and such ions as potassium, iron, calcium, magnesium, phosphate, and sulfate, as well as ions of trace elements like zinc, manganese, copper, molybdenum, etc. Iron is omissible in some cases. As water is included in the nutrient, most of these mineral salts will usually be present in sufficient quantity in ordinary potable water supplies. However, it is desirable to add the salts to the nutrient to insure their presence in sufficient quantity for growth. Usually the nutrient consists primarily of water, which may constitute 99 percent, or more, by weight of the nutrient, although it may also constitute a lesser portion, going down to 50 percent of the nutrient. Generally, any proportion of water heretofore employed in the growth of yeasts may be used.

A suitable mineral salts mixture may be listed as follows, the components being dissolved in enough water to make one liter of solution:

|  | Gram |
|---|---|
| Ammonium sulfate | 1.0 |
| Potassium dihydrogen phosphate | 2.0 |
| Sodium monohydrogen phosphate | 3.0 |
| Magnesium sulfate | 0.2 |
| Calcium chloride | 0.01 |
| Ferrous sulfate | 0.005 |
| Manganese sulfate | 0.002 |
| Sodium carbonate | 0.1 |
| Urea | 1.5 |

Another suitable mineral salts nutrient is as follows:

|  | Gram/Liter |
|---|---|
| Sodium monohydrogen phosphate | 9 |
| Potassium dihydrogen phosphate | 6 |
| Ammonium sulfate | 6 |
| Magnesium sulfate | 0.6 |
| Sodium carbonate | 0.3 |
| Calcium chloride | 0.03 |
| Ferrous sulfate | 0.015 |
| Manganese sulfate | 0.006 |
| Cobalt chloride | 0.006 |
| Sodium molybdate | 0.006 |

The method generally comprises incubating, in an incubation zone, the yeast in the mineral nutrient in the presence of the hydrocarbon, emulsifying agent, and oxygen. During incubation, the culture mixture is maintained under conditions to insure optimum growth of the yeast. The temperature, as described, should be maintained between about 20° and about 55° C., preferably from 25° to 40° C. The culture mixture is also maintained in the incubation zone, for example in a fermenter, in a condition of agitation as by shaking, or by using propellers, paddles, rockers, stirrers, or other means ordinarily employed for effecting agitation of a liquid mixture. The incubation zone may be open to the atmosphere, and with agitation of the mixture, the surface thereof exposed to the atmosphere is continuously renewed and oxygen is taken up. However, oxygen is preferably supplied by bubbling it or air through the mixture, thereby providing desired agitation.

The pH is initially fixed in any suitable way in the range of 2 to 4 as by first using an acid salt, such as a monobasic phosphate, to decrease the pH to, say, pH 5.5, and then using a mineral acid, such as hydrochloric acid, to decrease the pH to 2, 3, or 4, and it may be maintained in said range by periodic addition of ammonium hydroxide, the pH being monitored by means of a pH meter, preferably an indicating and recording one, or it may be maintained manually, or by means of pH paper. Maintenance of the pH of the culture mixture may also be effected with other suitable basic agents such as ammonia, sodium carbonate, and sodium hydroxide.

Cell yields of up to 20 grams per liter of culture mixture, or more, are obtainable. If desired, intracellular products, such as protein and lipids, may be recovered conventionally, as by rupturing the cell walls and extracting the products from the resulting debris, and thereafter separating the extract further as desired.

More specifically, the method may be operated on a batch or a continuous basis. In the former, the initial charge of culture mixture is maintained throughout, there being no additions and, except for test samples, no withdrawals. In the latter, additions and withdrawals are made, either continuously or intermittently, throughout the course of a run.

In a bath run, growth is carried on to a desired extent and is halted while the culture mixture emulsion is still oil phase continuous.

Growth, and also the state of the emulsion, may be followed by removing test samples of the mixture from time to time and analyzing the same. When it is desired to stop the growth, the described pH change is made by the operator, whereupon the emulsion breaks and the cells pass to the bottom of the mixture. One of the advantages of the invention is that almost complete phase separation can be achieved, generally in a matter of a few minutes. THe oil and aqueous phases may be decanted and the cells recovered. The oil and aqueous phases may be reused, if feasible, or worked up to recover any values, or discarded. The emulsifying agent is unchanged and may be recovered.

In a continuous run the procedures used in a batch run are applicable except that additions of hydrocarbon, emulsifying agent, and aqueous mineral nutrient, and withdrawals of culture mixture, are made throughout the course of the run either on an intermittent or a continuous basis. These additions and withdrawals are balanced not only to maintain the quantity or level of culture mixture in the apparatus but also to maintain the condition of the emulsion, i.e., as a water-in-oil emulsion of substantially constant composition. The withdrawn culture mixture is suitably maintained at incubation conditions and the pH is changed by the operator to bring about emulsion breakdown and separation of the phases; the cells are then separated and recovered, and the coil and aqueous phases are saved for reuse, being reconstituted as necessary. The unchanged emulsifying agent may also be recovered. The withdrawals and additions may be initiated at any desired time, either at the point of maximum concentration or growth of the cells or at some earlier point. The point of maximum growth may easily be established as by plotting a graph of variance between cell concentration and time of run, care being taken to keep the culture mixture in the form of an oil phase-continuous emulsion. An advantage of a continuous run is to provide a continuous yield of cells from a given apparatus. Another advantage is that toxic products, i.e., products toxic to the cells, which tend to collect in the aqueous phase, may be continuously removed from the system.

The method, batch or continuous, may be carried out in any desired apparatus heretofore used for growing yeasts.

The invention will be illustrated by the following example.

EXAMPLE 1

Into an air lift fermenter there were placed 3 liters of n-hexadecane and 1.5 liters of aqueous mineral salts solution and the mixture was inoculated with a yeast, *Candida lipolytica*.

About 60 milliliters of a nonionic emulsifying agent comprising a branched chain nonyl phenol ethoxylate having 4 ethylene oxide groups were also added to the mixture to promote an oil phase-continuous emulsion. The pH of the culture mixture was adjusted to pH 3.5 by adding hydrochloric acid and maintained at such value by additions of ammonium hydroxide. The culture mixture was incubated at 35° C. and air passed through it at a rate of 0.68 cubic foot per minute until maximum growth was achieved, corresponding to a cell density of 17 grams per liter (dry weight). At this density, continuous operation was started by withdrawing 300 milliliters of culture mixture per hour. On adjusting the pH of each such 300-milliliter sample to pH 4.5, the mixture separated rapidly and quantitatively into phases comprising 200 milliliters of a hydrocarbon phase and 100 milliliters of aqueous phase containing the yeast cells. The cells were recovered from the aqueous phase by decantation. Adjustment of the pH was made by addition of ammonium hydroxide. The separated hydrocarbon phase was returned to the fermenter together with 100 milliliters of fresh aqueous mineral nutrient solution. After 24 hours of continuous operation, the cell density levelled off to about 10 grams per liter. No contamination was observed during the run. Results were repeated in other runs.

We claim:

1. In a method for producing an aerobic, hydrocarbon-utilizing yeast wherein said yeast is grown in an oxygen-containing incubation zone in an agitated culture mixture in the form of an oil phase-continuous emulsion of oil and water, the oil phase of which comprises a hydrocarbon and the water phase of which comprises an aqueous mineral nutrient solution, the improvement comprising:
   1. maintaining the pH of said emulsion in the range of 2–4 during growth of said yeast,
   2. growing said yeast to a desired extent but not to a point where said emulsion inverts into a higher viscosity, more stable, water phase-continuous emulsion,
   3. thereafter bringing said emulsion to breakdown point by raising the pH of said emulsion at least one-half pH unit into the range of above 4 but not above 5, thereby separating said emulsion into an oil phase and a water phase, said water phase containing the cells of said yeast, and
   4. recovering said yeast cells from said water phase.

2. In a method for producing an aerobic, hydrocarbon-utilizing yeast wherein said yeast is grown in an oxygen-containing incubation zone in an agitated culture mixture in the form of an oil phase-continuous emulsion of oil and water, the oil phase of which comprises a hydrocarbon and the water phase of which comprises an aqueous mineral nutrient solution, the improvement comprising:
   1. maintaining the pH of said emulsion in the range of 2–4 during growth of said yeast,
   2. maintaining said emulsion near to inversion conditions by
      a. initially adding thereto 0.1 to 3.0 percent volume basis, of an emulsifying agent which promotes an oil phase-continuous emulsion and which has an operating temperature falling between 20° and 55° C.,
      b. maintaining the temperature of said emulsion in the range of 20° to 55° C., and
      c. maintaining the amount of hydrocarbon in said emulsion in the range of 15 to 85 percent, volume basis, of said emulsion,
   3. growing said yeast to a desired extent but not to a point where said emulsion inverts into a higher viscosity, more stable, water phase-continuous emulsion,
   4. thereafter bringing said emulsion to breakdown point by raising the pH of said emulsion at least one-half pH unit into the range of above 4 but not above 5, thereby separating said emulsion into an oil phase and a water phase, said water phase containing cells of said yeast, and
   5. recovering said yeast cells from said water phase.

3. In a method for producing an aerobic, hydrocarbon-utilizing yeast wherein said yeast is grown in an oxygen-containing incubation zone in an agitated culture mixture in the form of an oil phase-continuous emulsion of oil and water, the oil phase of which comprises a hydrocarbon and the water phase of which comprises an aqueous mineral nutrient solution, the improvement comprising:
   1. maintaining the pH of said emulsion in the range of 2–4 during growth of said yeast,
   2. maintaining said emulsion near to inversion conditions by
      a. initially adding thereto 0.5 to 1.5 percent, volume basis, of an emulsifying agent which promotes an oil phase-continuous emulsion and which has an operating temperature falling between 20° and 55° C., b. maintaining the temperature of said emulsion in the range of 25° to 40° C., and c. maintaining the amount of hydrocarbon in said emulsion in the range of 25 to 75 percent, volume basis, of said emulsion, 3. growing said yeast to a desired extent but not to a point where said emulsion inverts into a higher viscosity, more stable, water phase-continuous emulsion, 4. thereafter bringing said emulsion to breakdown point by raising the pH of said emulsion at least one-half pH unit into the range of above 4 but not above 5, thereby separating said emulsion into an oil phase and a water phase, said water phase containing cells of said yeast, and 5. recovering said yeast cells from said water phase.

4. The method of claim 1 wherein said yeast is Candida lipolytica.

5. The method of claim 1 wherein said yeast is Pichia polymorphus.

* * * * *